July 28, 1942.  N. W. CUMMINS  2,291,028
FRUIT JUICE EXTRACTOR
Filed May 7, 1941

NORMAN W. CUMMINS
INVENTOR

BY *Arthur J. Robert*
ATTORNEY

Patented July 28, 1942

2,291,028

UNITED STATES PATENT OFFICE 2,291,028

FRUIT JUICE EXTRACTOR

Norman W. Cummins, Louisville, Ky.

Application May 7, 1941, Serial No. 392,394

4 Claims. (Cl. 146—3)

This invention relates to fruit juice extractors of the type wherein a stationary bowl and strainer and a manually rotatable juice extracting head are superimposed one over the other in vertically separable relation with the strainer supported on the bowl and the head supported on the upper end of a post projecting centrally upward from the strainer. In extractors of this type, juice is extracted from a piece of citrus fruit, for example, simply by pressing fruit halves over the head while manually oscillating the head.

An important object of the invention is to hasten the drainage of the juice through such pulp as may collect on the strainer during the juicing operation.

Another important object is to provide an extractor which may be operated with equal facility either upon a flat surface or a wall bracket at the option of the user.

A further object is to accomplish these objectives without complicating the assembly, rendering it less easy to assemble and disassemble or otherwise making it objectionable.

An embodiment of the invention is illustrated in the accompanying drawing wherein.

Figure 1:
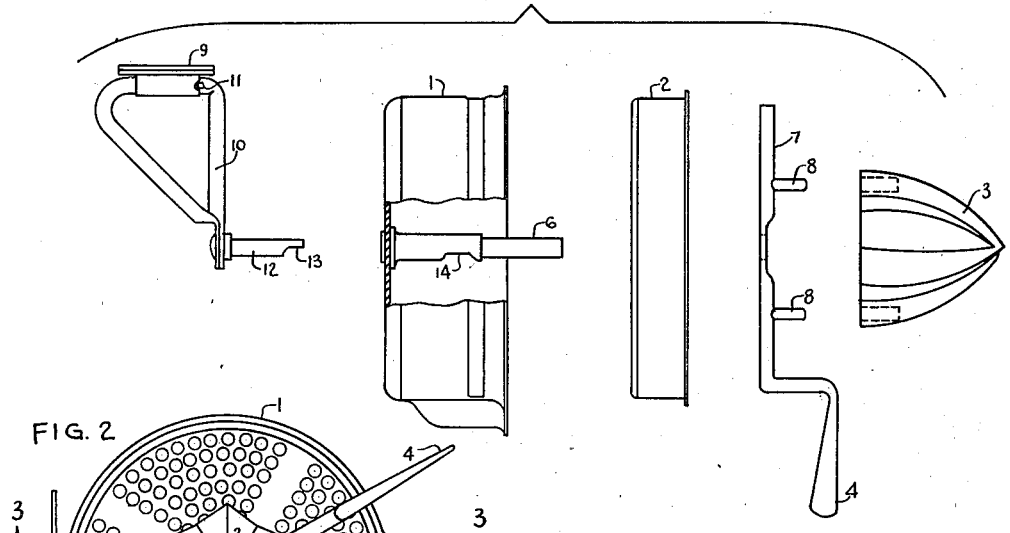
Figure 1 is a side elevation of the parts in vertically separated relation with the bond partly broken for sake of clearness.
Figure 2:
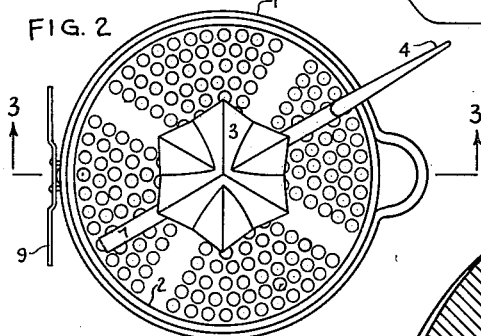
Figure 2 is a top plan view.
Figure 3:
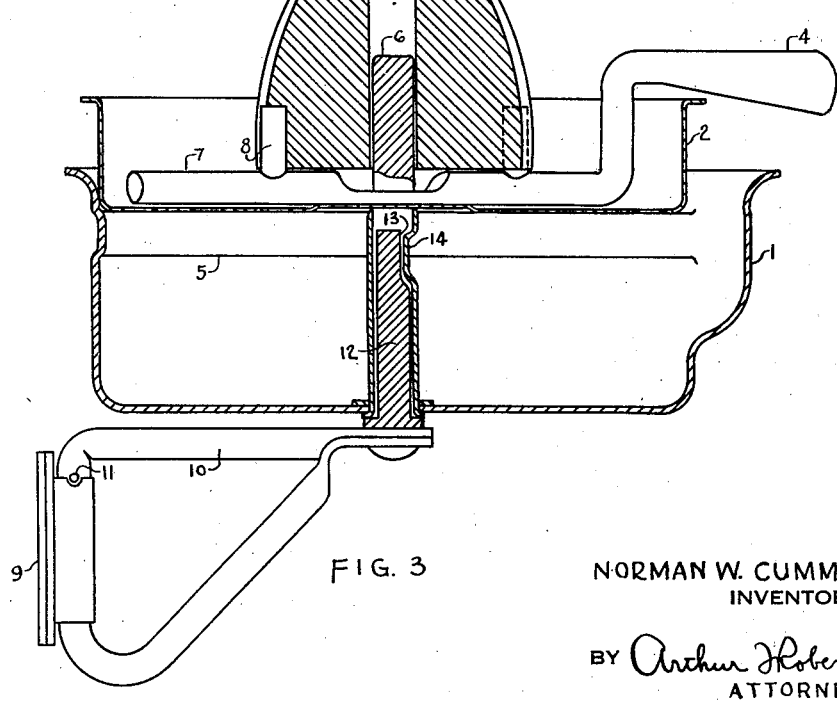
Figure 3 is a vertical section along line 3—3 of Figure 2.

The fruit juice extractor illustrated conventionally includes: a stationary base composed of a receptacle or bowl 1 for the juice and a stationary strainer 2; and a manually rotatable juice extracting head 3 having a laterally extending handle 4 by which it may be manually oscillated. The bowl 1, strainer 2 and head 3 are superimposed one over the other in vertically separable relation with the strainer resting upon a bead 5 formed on the inner wall of the bowl, adjacent its upper end, and with the head removably supported upon the upper end of a post 6 projecting centrally upward from the strainer and preferably secured to the bowl although it may, of course, be secured to the strainer. With this arrangement, juice may be extracted from a citrus fruit halve simply by pressing the halve over the head while manually turning the handle 4 to oscillate the head. When the juicing operation is finished, the parts may be quickly disassembled, cleaned and then reassembled for subsequent use.

In accordance with my invention, a pulp stirrer 7 is arranged to extend over, and in close proximity to, the bottom of the strainer, and connected to the head for rotation or oscillation with it, in order to stir the pulp as it collects and thus insure the rapid drainage of the juice into the bowl. While any suitable form of stirrer may be employed, one which extends diametrically or otherwise across the strainer is preferred since it may be conveniently and inexpensively turned upwardly at one end to extend along the side wall of the strainer and thence directed outwardly over the edge of the strainer to provide the handle 4. Furthermore, while it may be variously positioned relatively to the head and either integrally or detachably connected to the head, it preferably is interposed between the strainer and the head, rotationally mounted on the post 6, and detachably connected to the head in vertically separable relation by means of pintles 8 integrally formed on the stirrer 7 to extend upwardly into suitable recesses in the head 3. This arrangement is not only inexpensive to manufacture but easy to assemble or disassemble and, when assembled, effective in operation.

While the bottom of the bowl 1 is conventionally made flat so that it may rest upon a table top or other flat surface during or between intervals of use, in further accordance with my invention it is also centrally recessed upwardly so that it may be placed over and supported upon a wall bracket in vertically separable relation. With the post 6 secured to the bowl, the latter may be arranged for this type of mounting simply by making the post hollow and having its lower end open through the bottom of the bowl. While any suitable form of bracket may be employed, the simple form shown is very satisfactory. This bracket comprises: a plate 9 which may be screwed or otherwise rigidly secured to a wall; an arm 10 pivotally mounted on the plate for movement from an inoperative position, in which it extends parallel to the wall and plate, to an operative position in which it extends outwardly from the wall and the plate; and a stud 12 projecting upwardy from the outer end of the arm. The arm 10 may be easily locked in the operative position by means of a pin 11 arranged on the arm to rest in an upwardly open groove on the plate. In mounting the extractor upon the bracket, the bottom opening of the bowl 1 is placed over the stud 12. In order to prevent the bowl from rotating, relatively to the stud, a lock is formed by reducing or chamfering the upper end portion 13 of the stud while flattening the corresponding portion 14 of the post 6. With this arrangement, the extractor may be readily secured to or removed from the wall bracket and hence operated upon the bracket or upon a flat surface at the option of the user.

Having described my invention, I claim:

1. An improvement in fruit juice extractors of the type wherein a stationary strainer and a manually rotatable juice extracting head are superimposed one over the other in vertically separable relation with the head supported on a post projecting upwardly from the strainer comprising: a pulp stirrer extending over, and in close proximity to, the bottom of the strainer and connected to rotate with the head, the stirrer being interposed between the head and strainer and detachably connected to the head in vertically separable relation.

2. A fruit juice extractor comprising: a base having a strainer and a post projecting upwardly from the strainer; a pulp stirrer rotationally mounted on the post to extend over, and in close proximity to, the bottom of the strainer; a juice extracting head rotationally mounted on the post over the stirrer; means for rotating the head; and means connecting the stirrer to rotate with the head, the strainer, stirrer and head being superimposed one over the other in vertically separable relation.

3. A fruit juice extractor comprising: a bowl open at the top and having a bead on its inner wall adjacent its upper end; a strainer resting on said bead and vertically separable from said bowl; a post centrally secured to said bowl to extend upwardly through said strainer; a pulp stirrer rotationally mounted on said post to extend over, and in close proximity to, the bottom of the strainer, said stirrer being extended upwardly above the upper end of the strainer and outwardly over an edge thereof to provide a handle by which it may be manually rotated; a juice extracting head rotationally mounted on said post over said stirrer; and means detachably connecting the stirrer and the head for rotation together in vertically separable relation.

4. An improvement in fruit juice extractors of the type wherein a stationary strainer and a manually rotatable juice extracting head are superimposed one over the other in vertically separable relation with the head supported on a post projecting upwardly from the strainer comprising: a pulp stirrer extending over, and in close proximity to, the bottom of the strainer and connected to rotate with the head, the stirrer being interposed between the head and strainer, rotationally mounted on the post and detachably connected to the head in vertically separable relation.

NORMAN W. CUMMINS.